United States Patent
Lin

(10) Patent No.: US 7,434,159 B1
(45) Date of Patent: Oct. 7, 2008

(54) AUTOMATICALLY LAYOUT OF DOCUMENT OBJECTS USING AN APPROXIMATE CONVEX FUNCTION MODEL

(75) Inventor: Xiaofan Lin, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 505 days.

(21) Appl. No.: 11/126,637

(22) Filed: May 11, 2005

(51) Int. Cl.
*G06F 15/00* (2006.01)
(52) U.S. Cl. ...................... 715/243; 715/246
(58) Field of Classification Search ................. 715/500, 715/517–521, 200, 243–247
See application file for complete search history.

(56) References Cited

U.S. PATENT DOCUMENTS

| | | | |
|---|---|---|---|
| 6,088,708 A | 7/2000 | Burch et al. | |
| 6,144,974 A | 11/2000 | Gartland | |
| 6,697,999 B1 | 2/2004 | Breuer et al. | |
| 6,907,431 B2 * | 6/2005 | Lin | 707/102 |
| 7,151,547 B2 * | 12/2006 | Lin et al. | 345/627 |
| 2004/0019850 A1 | 1/2004 | Purvis et al. | |
| 2004/0019851 A1 | 1/2004 | Purvis et al. | |
| 2004/0019852 A1 | 1/2004 | Purvis | |
| 2004/0205472 A1 | 10/2004 | Purvis | |
| 2005/0094207 A1 * | 5/2005 | Lo et al. | 358/1.18 |
| 2006/0179405 A1 * | 8/2006 | Chao et al. | 715/517 |
| 2006/0224952 A1 * | 10/2006 | Lin | 715/517 |
| 2006/0224953 A1 * | 10/2006 | Lin et al. | 715/517 |
| 2008/0072183 A1 * | 3/2008 | Hershenson et al. | 716/2 |

* cited by examiner

*Primary Examiner*—Cesar B Paula

(57) ABSTRACT

In a method for automatically generating a document layout including an object containing text, an approximate convex function model for the object is built and linear constraints associated with the approximate convex function model are calculated. In addition, the linear constraints are solved for using a constraint satisfaction algorithm and the document layout is automatically generated based substantially upon the solutions to the linear constraints.

22 Claims, 10 Drawing Sheets

AUTOMATICALLY LAYOUT OF DOCUMENT OBJECTS USING AN APPROXIMATE CONVEX FUNCTION MODEL

BACKGROUND

Automatic document layout generation based upon variable content is a critical step in highly customized Variable Data Printing (VDP) applications. VDP applications generally refer to print jobs where particular objects are substituted for generic objects in the un-customized layout. More particularly, for instance, in VDP applications, the document layouts are highly customized for the individual recipients of the documents.

The customizations of the document layouts typically require a substantial amount of effort to generally ensure that the new layouts have certain aesthetic levels. In many instances, naïve placements of the objects in the new document layouts often destroy the aesthetics of the document layouts. By way of example, the naïve placements of objects in customizing the document layouts may result in destruction of alignment relationships between various objects, overlap between various ones of the objects, or creation of large gaps between various objects in the document. An experienced operator is typically required to manually adjust the documents to correct these problems, which greatly increases the costs associated with producing the customized documents.

It would thus be desirable to have a relatively inexpensive and automated system for creating new document layouts while substantially maintaining relatively high aesthetic levels.

SUMMARY

A method for automatically generating a document layout including an object containing text is disclosed herein. In the method, an approximate convex function model for the object is built and linear constraints associated with the approximate convex function model are calculated. In addition, the linear constraints are solved for using a constraint satisfaction algorithm. Moreover, the document layout is automatically generated based substantially upon the solutions to the linear constraints.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

An automatic document layout generation system and method are disclosed herein. The automatic document layout generation system and method generally operate to automatically generate a layout through the creation and use of convex functions that approximate the height-width relationships of objects containing text, including cells in a table. More particularly, the convex functions are employed to generate clusters of linear constraints that approximate the height-width relationships of the objects containing text. Solutions for these linear constraints may thus be determined through known constraint-satisfaction algorithms. In one regard, therefore, the linear constraints may be employed to automatically determine and generate the layout such that the object containing text is constrained to have suitable dimensions and be positioned in suitable locations as determined by these and other linear constraints.

Figure 1:
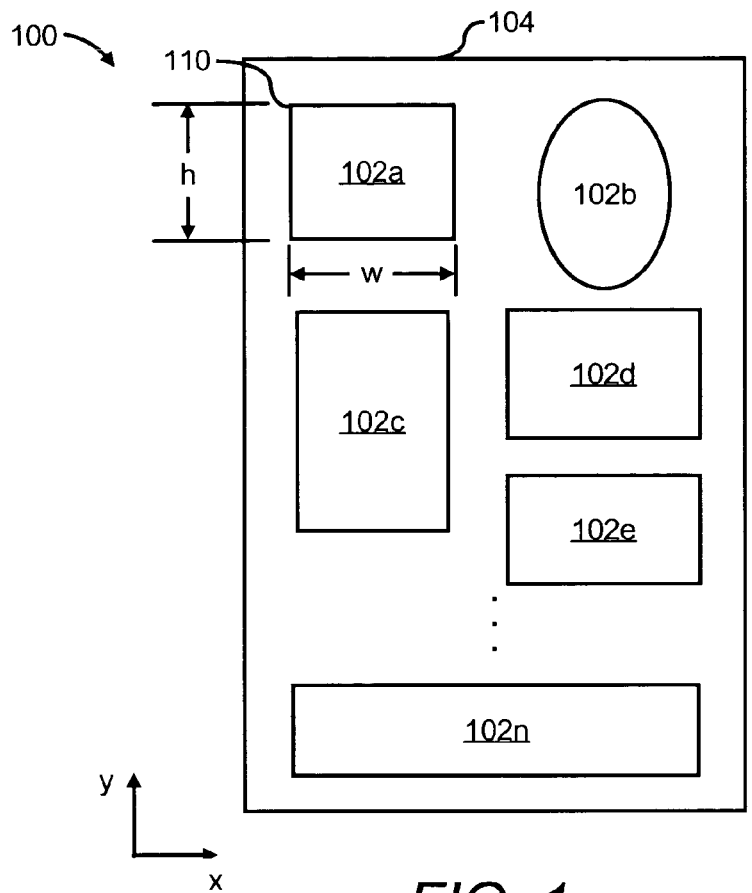
FIG. 1 depicts a schematic diagram of a generated layout that includes various objects positioned at various locations in the layout, according to an embodiment of the invention.

With reference to FIG. 1, there is shown a diagram of a layout 100. As shown in FIG. 1, the layout 100 includes objects 102a-102n arranged with respect to each other on a document 104. The objects 102a-102n may have been positioned with respect to each other and the document 104 through implementation of various systems and methods described in greater detail herein. In any respect, the "..." depicted in FIG. 1 generally indicate that any reasonably suitable number of objects may be included in the layout 100. It should be understood that the depiction of the objects 102a-102n in FIG. 1 is for purposes of illustration and is not meant to limit the document layout generation systems and methods described herein.

The objects 102a-102n may comprise text, drawings, photographs, graphic designs, or other images. In addition, the objects 102a-102n may comprise rectangular or non-rectangular shapes. In any event, the objects 102a-102n may represent the actual rectangular object or a rectangular bounding box of a rectangular or non-rectangular object 102a-102n. For instance, the objects 102a-102n may represent rectangular bounding boxes for objects containing text that have non-rectangular shapes. In addition, one or more of the objects 102a-102n may comprise non-rectangular shapes, such as shown with respect to the object 102b. As such, the objects 102a-102n, as used throughout the present disclosure, may be defined as any of the above-identified elements.

The dimensions of the objects 102a-102n, such as width (w) and height (h), may be expressed as a vector X(i), where "i" represents an object 102a-102n. In addition, the positions of the objects 102a-102n may be specified as a set of coordinates P(i) directed to, for instance, the top left corners 110 of the objects 102a-102n. Moreover, the coordinates P(i) may be defined according to a Cartesian coordinate system. As such, the coordinates P(i) may represent x and y coordinates, with an origin of the x-y coordinate system being located at, for instance, any of the corners of the document 104, the center of the document 104, or another arbitrarily selected position in the document 104.

In any regard, each of the objects 102a-102n may be considered as having a reference location 110. The positions and attributes of the objects 102a-102n may be defined as having a position P(i) and a height (h) and width (w) represented by a vector X(i) with respect to the reference location 110. This convention for identifying the positions and dimensions of the objects 102a-102n is employed throughout the present disclosure for purposes of simplicity. It should, however, be understood that various other manners may be employed to identify the positions and sizes of the objects 102a-102n without departing from a scope of the document layout generation systems and methods described herein.

Generally speaking, the layout 100 may be generated in a number of different manners. For instance, if some of the content in an existing document is to be changed to generate the new layout 100, the new layout 100 may be generated through various layout adjustment techniques. An example of a suitable layout adjustment technique is described in co-pending and commonly assigned U.S. patent application Ser. No. 11/107,175, filed on Apr. 15, 2005, and entitled "Automatic Layout Adjustment for Documents Containing Text", the disclosure of which is hereby incorporated by reference in its entirety. As described in that application, a single linear function may be employed to approximate the width-height function around the original layout if only minor changes from the original layout is expected.

The layout 100 may also be generated from artificially created layout templates. The layout templates may specify the topology or slicing structure of the objects 102a-102n, which typically dictate the relative positions of objects 102a-102n on the document 104. In this example, the new layout 100 may be generated using conventional linear constraint solving techniques, such as the Simplex algorithm, if the dimensions of the objects 102a-102n are fixed or allowed to change linearly.

However, automated generation of a new layout 100 in which the dimensions of one or more of the objects 102a-102n are not fixed, where one or more of the objects 102a-102n are allowed to change nonlinearly, or where the new layout includes a relatively large number of changes from an existing document, is relatively more difficult. Conventionally, if one or more of the objects 102a-102n contain text, determining the new layout 100 requires relatively sophisticated computations.

The difficulty for automated generation of layouts through implementation of conventional techniques is partly due to the fact that when an object 102n comprises text, the relationship between the height (h) and the width (w) of the object 102n may be non-linear. More particularly, for example, when the text content in a rectangular object 102n (i) is fixed, the width (w) and height (h) of the object 102n roughly follow:

$$w(i)*h(i)=a, \text{ where } a \text{ is a constant.} \qquad \text{Equation (1)}$$

Figure 2:
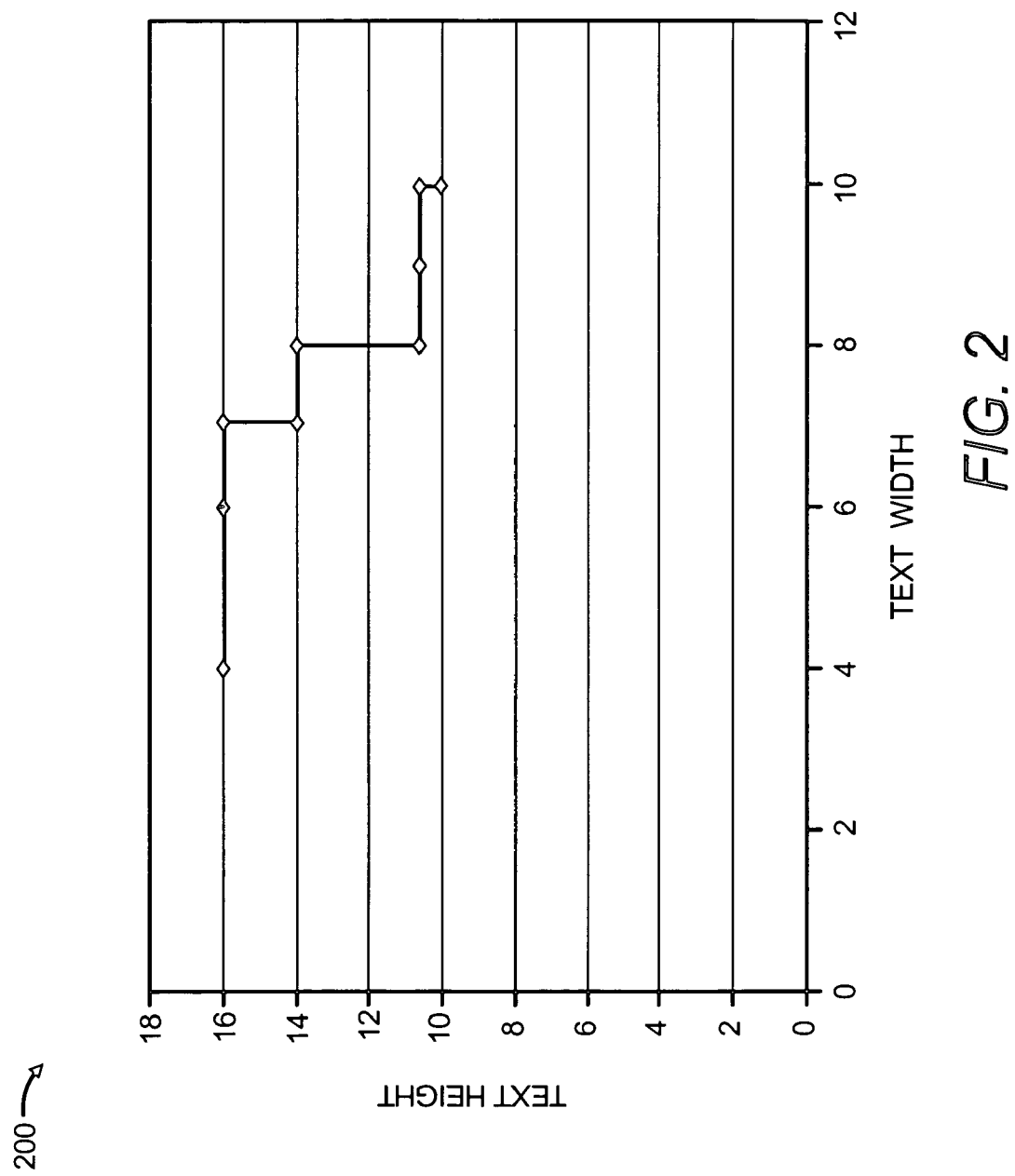
FIG. 2 shows a graph depicting the stepwise relationship between the height and width of an object containing text, according to an embodiment of the invention.

Equation (1) illustrates that a non-linear relationship exists between the width (w) and the height (h) of the object 102n. In addition, the exact relationship between the width (w) and the height (h) of the object 102n is relatively more complex because the height (h) is not a continuous function of the width (w), but instead follows a stepwise pattern. With particular reference to FIG. 2, there is shown a graph 200 depicting the stepwise relationship between the height (h) and width (w) of an object 102n containing text. As shown in FIG. 2, the height-width relationship of the object 102 may comprise a non-continuous stepwise pattern. It should be understood that the graph 200 is merely an example of a possible height-width relationship and is therefore not intended to limit the systems and methods disclosed herein.

According to various examples, the new layout 100 may be generated through relatively simple and efficient, automated manners, while generally compensating for the non-linear relationships between the widths (w) and the heights (h) of objects 102a-102n containing text. More particularly, for instance, the substantially optimal width-height balance for the objects 102a-102n may be determined through use of multiple linear functions. In one respect, the multiple linear functions may be introduced to solve for the original non-linear width-height relationships of the objects 102a-102n. These examples are described in greater detail herein below with respect to the following figures.

Figure 3:
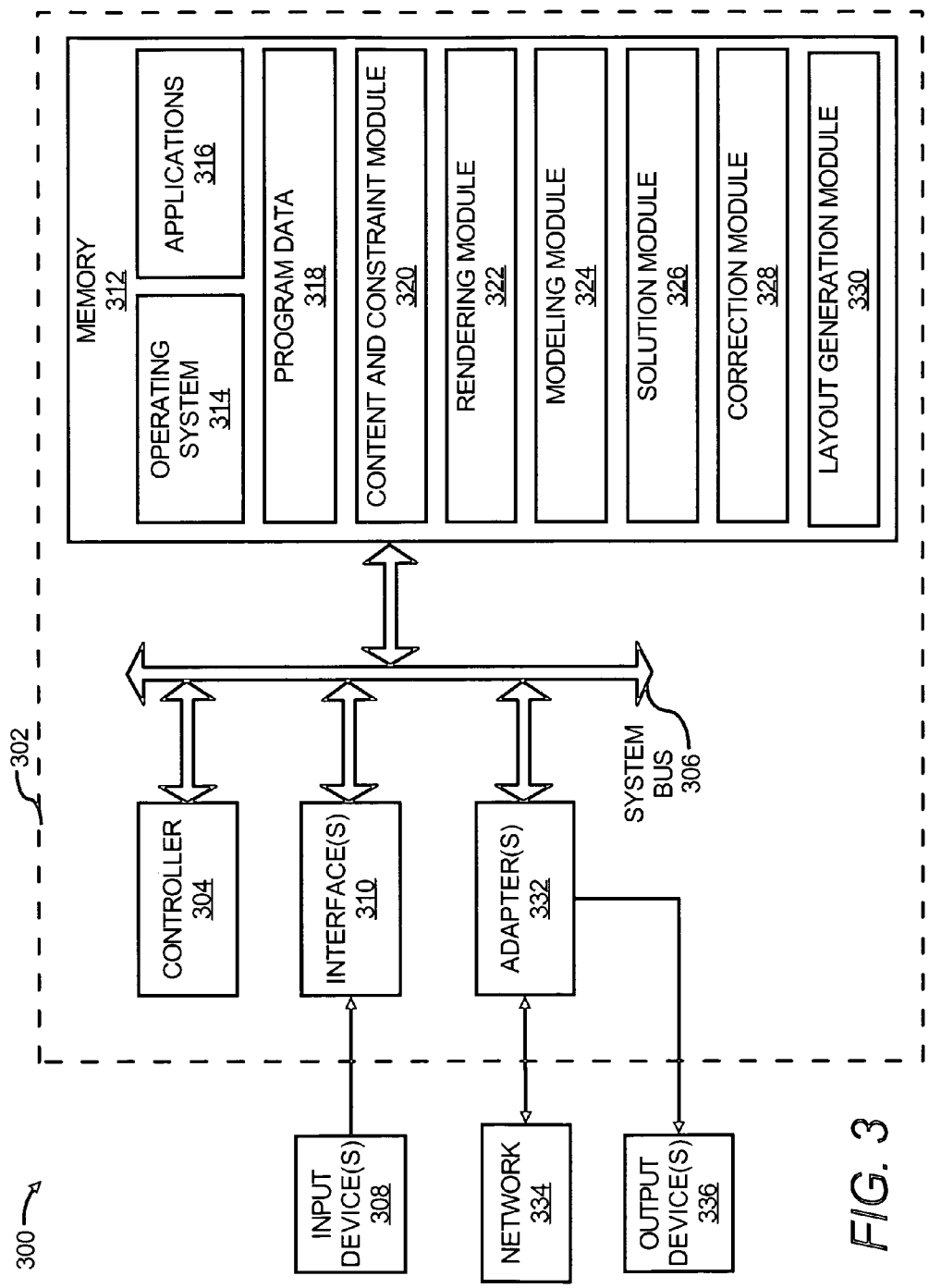
FIG. 3 illustrates a block diagram of a layout generation system suitable for implementing, either fully or partially, various document layout generations, according to an embodiment of the invention.

Referring first to FIG. 3, there is shown a block diagram 300 of a layout generation system 302 suitable for implementing, either fully or partially, various document and table layout generation techniques described herein. It should be understood that the following description of the block diagram 300 is but one manner of a variety of different manners in which such a layout generation system 302 may be configured or operated. In addition, it should be understood that the layout generation system 302 may include additional components and that some of the components described may be removed and/or modified without departing from a scope of the layout generation system 302. Although the layout generation system 302 is depicted as comprising a computing device, various functions of the layout generation system 302 may be performed by various software and/or hardware contained in a computing device. However, the following description of the layout generation system 302 is set forth with the layout generation system 302 comprising a computing device for purposes of simplicity.

The layout generation system 302 may comprise a general computing environment and includes a controller 304 configured to control various operations of the layout generation system 302. The controller 304 may comprise a microprocessor, a micro-controller, an application specific integrated circuit (ASIC), and the like. Data may be transmitted to various components of the layout generation system 302 over a system bus 306 that operates to couple the various components of the layout generation system 302. The system bus 306 represents any of several types of bus structures, including, for instance, a memory bus, a memory controller, a peripheral bus, an accelerated graphics port, a processor bus using any of a variety of bus architectures, and the like.

One or more input devices 308 may be employed to input information into the layout generation system 302. The input devices 308 may comprise, for instance, a keyboard, a mouse, an image scanner, a disk drive, removable media, flash drives, and the like. The input devices 308 may be used, for instance, to input content to be included in the new layout 100 or the table layout 600 (FIG. 6) and the layout constraints to the layout generation system 302. In any regard, the input devices 308 are connected to the controller 304 through an interface 310 that is coupled to the system bus 306. The input devices 308 may, however, be coupled by other conventional interface and bus structures, such as, parallel ports, USB ports, etc.

The controller 304 may be connected to a memory 312 through the system bus 306. Generally speaking, the memory 312 may be configured to provide storage of software, algorithms, and the like, that provide the functionality of the layout generation system 302. By way of example, the memory 312 may store an operating system 314, application programs 316, program data 318, and the like. In this regard, the memory 312 may be implemented as a combination of volatile and non-volatile memory, such as DRAM, EEPROM, MRAM, flash memory, and the like. In addition, or alternatively, the memory 312 may comprise a device configured to read from and write to a removable media, such as, a floppy disk, a CD-ROM, a DVD-ROM, or other optical or magnetic media.

The memory 312 may also store modules programmed to perform various layout generation functions. More particularly, the memory 312 may store a content and constraint module 320, a rendering module 322, a modeling module 324, a solution module 326, a correction module 328, and a layout generation module 330. Generally speaking, the controller 304 may implement the modules 320-330 to generate the layout 100 of a document 104 or the table layout 600.

More particularly, the controller 304 may implement the content and constraint module 320 to store information regarding various content to be included in the layout 100, 600, and the layout constraints to be applied during a layout generation process. For instance, the content and constraint module 320 may store various aesthetic rules or constraints as constraints in the form of equalities or inequalities, to be applied in the layout 100, 600. In certain instances, the content and constraint module 320 may encode the aesthetic rules as constraints in the form of equalities or inequalities.

With respect to the table layout 600, the controller 304 may also implement content and constraint module 320 to describe the table layout 600 in a table description language. In addition, the controller 304 may implement the content and constraint module 320 to convert the table description into a set of linear constraints. A more detailed description of these operations is provided herein below with respect to FIG. 7A.

The controller 304 may implement the rendering module 322 to render the heights of the objects 102a-102n or the cells 602a-602n (FIG. 6) containing text at different widths to determine the actual height-width relationships of the objects 102a-102n or the cells 602a-602n.

The controller 304 may implement the modeling module 324 to build convex function models of the objects 102a-102n or the cells 602a-602n at the variously rendered heights and widths. In addition, the modeling module 324 may be implemented to locate sampling points along the convex function models and to calculate linear constraints associated with the convex function models. The modeling module 324 may further be implemented to append the calculated linear constraints to existing constraints.

The controller 304 may implement the solution module 326 to solve the existing constraints and the calculated linear constraints using constraint-satisfaction algorithms. The constraint-satisfaction algorithms may be employed to calculate values for the estimated dimensions $X'(i)$ of the objects 102a-102n or the cells 602a-502n and their positions $P(i)$. The constraint satisfaction algorithms may comprise, for instance, the Simplex algorithm. Various manners in which solutions for the existing constraints and the calculated linear constraints may be obtained are described in greater detail herein below.

The controller 304 may implement the correction module 328 to substantially ensure that the values of the estimated dimensions $X'(i)$ for the objects 102a-102n or cells 602a-602n containing text accurately reflect the relationships between the heights and widths of the objects 102a-102n or the cells 602a-602n containing text. More particularly, for instance, the controller 304 may implement the correction module 328 to map the estimated heights and widths of the objects 102a-102n or the cells 602a-602n back to the actual dimensions $X(i)$ to determine whether there are errors in the estimated dimensions $X'(i)$. The actual dimensions $X(i)$ may comprise the dimensions of the objects 102a-102n or the cells 602a-602n rendered through implementation of the rendering module 322. If errors are found, the controller 304 may implement the correction module 328 to replace the erroneous values with correct values.

In addition, or alternatively, the controller 304 may implement the correction module 328 to perform a line breaking redo operation on the objects 120a-102n or cells 602a-602n to ensure that the text may successfully be contained within the estimated dimensions $X'(i)$ of the objects 120a-102n or cells 602a-602n. More particularly, the controller 304 may implement the correction module 328 to redo the line breaks, and in certain instances, the spacing between characters/words, with the constraint that the stack of lines produced must end up having the estimated height. If it is determined that the stack of lines produced does not end up having the estimated height, the controller 304 may implement the correction module 328 to correct the values of the estimated dimensions $X'(i)$ as described herein below.

The controller 304 may implement the layout generation module 330 to generate the layout 100, 600 having the attributes and layout determined through implementation of the modules 320-328. The controller 304 may also implement the layout generation module 330 to convert the layout 100, 600 into a conventional format such that the generated layout 100, 600 may be output from the layout generation system 302.

The generated layout 100, 600 or data pertaining to the generated layout 100, 600 may be transmitted outside of the layout generation system 302 through one or more adapters 332. In a first example, the generated layout 100, 600 data may be transmitted to a network 334, such as, an internal network, an external network (the Internet), etc. In a second example, the generated layout 100, 600 data may be outputted to one or more output devices 336, such as, displays, printers, facsimile machines, etc.

Various manners in which the controller 304 performs various document layout generation functions are described in greater detail herein below with respect to FIGS. 4A-4C, 7A, and 7B.

Figure 4A:
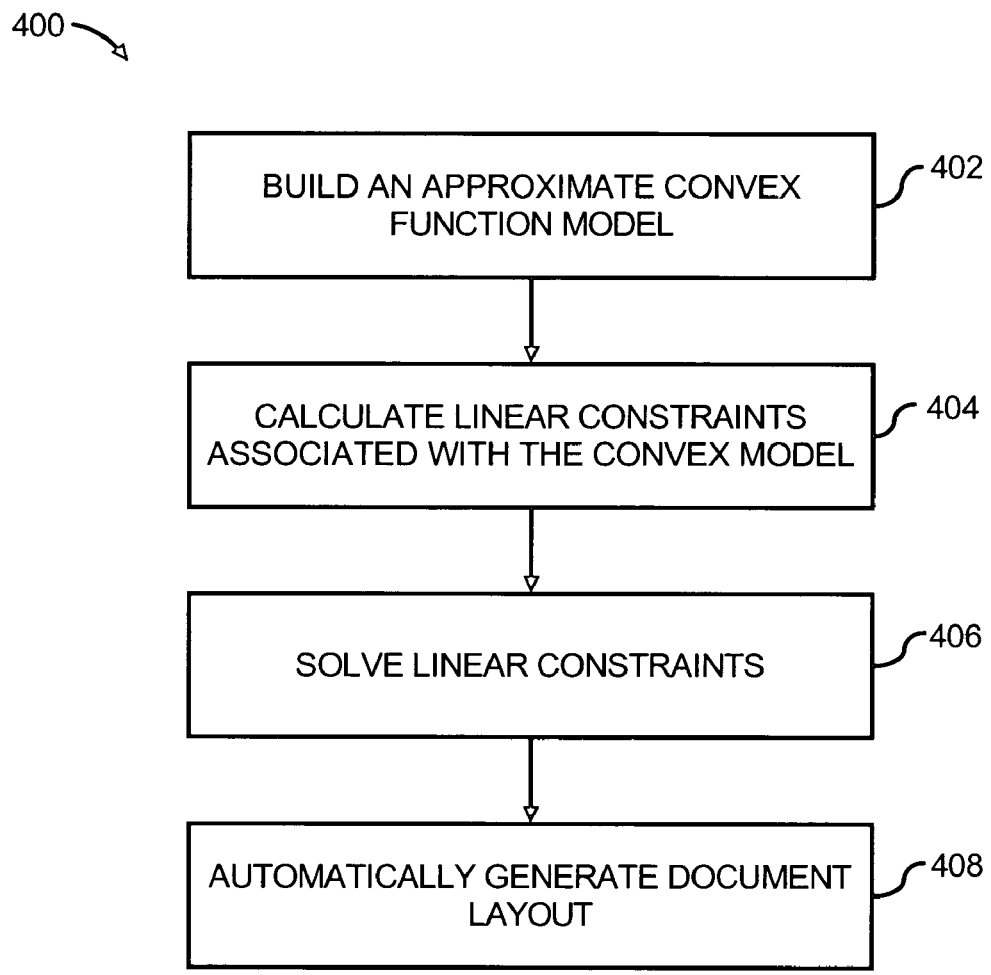
FIG. 4A illustrates a flow diagram of a method for automatically generating a document layout, according to an embodiment of the invention.

With reference first to FIG. 4A, there is shown a flow diagram of a method 400 for automatically generating a document layout 100, 600. It is to be understood that the following description of the method 400 is but one manner of a variety of different manners in which the layout 100, 600 may be generated including the objects 102a-102n or cells 602a-602n. It should also be apparent to those of ordinary skill in the art that the method 400 represents a generalized illustration and that other steps may be added or existing steps may be removed or modified without departing from a scope of the method 400. The description of the method 400 is made with reference to the block diagram 300 illustrated in FIG. 3, and thus makes reference to the elements cited therein. It should, however, be understood that the method 400 shown in FIG. 4A is not limited to being implemented by the elements shown in FIG. 3 and may be implemented by more, less, or different elements as those shown in FIG. 3.

As shown in the method 400, an approximate convex function model for the object 102a-102n or cell 602a-602n containing text is built at step 402. At step 404, linear constraints associated with the convex function model are calculated. In addition, at step 406, the linear constraints are solved using a constraint satisfaction algorithm. Moreover, the document layout is automatically generated based substantially upon the solutions to the linear constraints for the object at step 408.

The steps outlines in the method 400 are described in greater detail herein below with respect to FIGS. 4B, 4C, 7A, and 7B. FIGS. 4B, 4C, 7A, and 7B also describe additional steps that may be performed in conjunction with or in place of the steps outlines in the method 400.

Figure 4B:
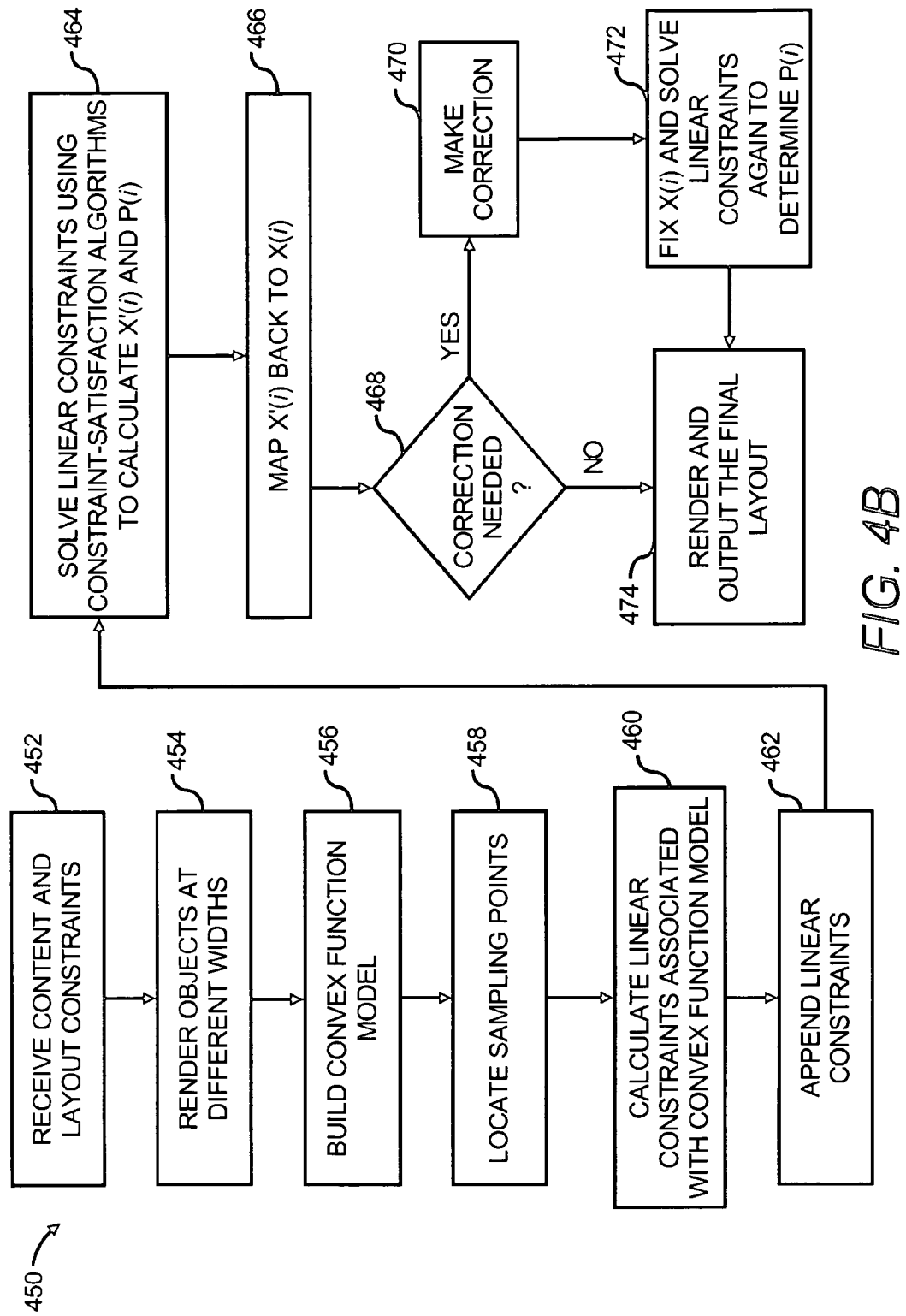
FIG. 4B illustrates a flow diagram of a method similar to the method depicted in FIG. 4A, according to an embodiment of the invention.

With reference now to FIG. 4B, there is shown a flow diagram of a method 450 for automatically generating a document layout, according to an example. It is to be understood that the following description of the method 450 is but one manner of a variety of different manners in which the layout may be generated. It should also be apparent to those of ordinary skill in the art that the method 450 represents a generalized illustration and that other steps may be added or existing steps may be removed or modified without departing from a scope of the method 450. The description of the method 450 is made with reference to the block diagram 300 illustrated in FIG. 3, and thus makes reference to the elements cited therein. It should, however, be understood that the method 450 shown in FIG. 4B is not limited to being implemented by the elements shown in FIG. 3 and may be implemented by more, less, or different elements as those shown in FIG. 3.

The method 450 may be implemented as an automated algorithm for generating the layout 100 of objects 102a-102n according to various criteria as described below. Broadly speaking, generation of the layout 100 includes a determination of the positions P(i) and attributes X(i) of the objects 102a-102n in a document 104 based upon various constraints. Generation of the layout 100 also includes placing the objects 102a-102n on the document 104 at their determined positions P(i) and with their determined attributes X(i).

As shown in FIG. 4B, the layout generation system 302 may receive content and constraints to be used in generating a document 104 having the new layout 100, at step 452. The content may include content in the form of objects 102a-102n to be included in the document 104. The constraints may be in the form of a template and may include limitations to be applied with respect to one or both of the positions and attributes of the objects 102a-102n. In other words, the constraints may comprise various restrictions in the manners in which the objects 102a-102n are positioned and sized in the new layout 100. The constraints may generally be imposed in order to retain certain aesthetic requirements in the new layout 100. In this regard, the constraints may comprise, for instance, alignment constraints, aspect ratio constraints, dimension range constraints, separation constraints, order constraints, etc. Thus, for instance, the constraints may require that the object 102a be above the object 102b, that the object 102c must be positioned at a particular location on the document 104 with set attributes, that the object 102a have a certain set of attributes, etc.

Some or all of the constraints may also be stored in the form of linear constraints. More particularly, for instance, the layout generation system 302 may receive the constraints in the form of linear constraints having equalities or inequalities. Alternatively, the layout generation system 302 may receive the constraints in the form of aesthetic rules which the layout generation system 302 may encode into constraints in the form of linear constraints having equalities or inequalities.

In various circumstances, less than all of the objects 102a-102n may contain text. In addition, constraints may be imposed on some of the objects 102a-102n containing text such that some of the objects 102a-102n are restricted to be positioned at a set location or that they have set sizes. As such, some of the objects 102a-102n containing text may be prohibited from being changed in the new layout 100.

At step 454, for those objects 102a-102n containing text whose heights and widths are allowed to change, the objects 102a-102n are rendered at several different widths (w1, w2, ... wn) to determine their corresponding heights (h1, h2, ... hn). As described herein above, the relationship between the widths and heights of objects 102a-102n containing text is typically non-linear. In this regard, a linear constraint is typically unavailable to determine the width-height relationships. Instead, the width-height relationships may be determined through a method that actually replaces the text content in the objects 102a-102n into various text containers having different widths to determine this width-height relationship. An example of a result of this estimation method is shown in Table 1 below, which illustrates discrete pairs of widths and heights. The relationships between the various heights and widths shown in Table 1 are considered to be "error-free" representations because the relationships are determined through actual text placement into differently sized text blocks.

TABLE 1

Lookup Table for Height-Width Relationship

| Width (wn) (points) | 200 | ... | 340 | 350 | 360 | 370 | 380 | 390 | ... | 500 |
|---|---|---|---|---|---|---|---|---|---|---|
| Height (hn) (lines) | 41 | ... | 24 | 23 | 22 | 22 | 21 | 20 | ... | 16 |

Figure 5A:
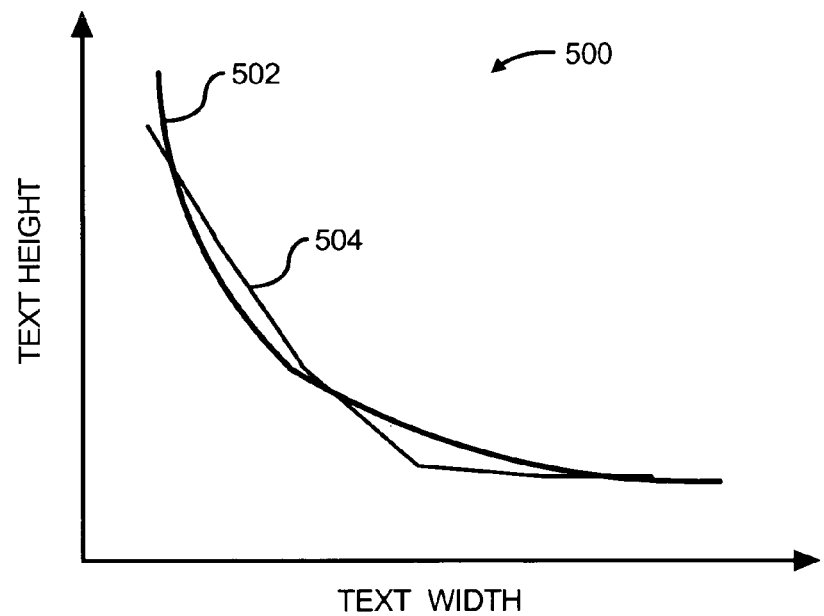
FIG. 5A shows a graph of a convex function curve for an object, according to an embodiment of the invention.

At step 456, a convex function model may be built based upon the data points (w1, h1), (w2, h2), ... (wn, hn) determined at step 454. The convex function model may be built out of a number of rendering results with different (w, h) combinations as shown, for instance, in FIG. 5A. FIG. 5A, more particularly, shows a graph 500 of a convex function curve 502 built from line segments 504 corresponding to data points (w1, h1), (w2, h2), ... (wn, hn). The line segments 504 may be formed through a connection between adjacent data points. In addition, the data points (w1, h1), (w2, h2), ... (wn, hn) may be fitted into the convex function curve 502, such as the following hyperbolic function:

$h(w) = k/w + b$, where $k$ and $b$ are constant for a given text content and format. (Equation 2)

In addition, the constants k and b may be calculated through use of any reasonably suitable regression method. In addition, the constants k and b may be used to solve for various heights in Equation (2) to therefore build the convex function curve 502.

Generally speaking, convex functions cover all functions whose first-order derivative is always increasing. Examples of equations that may be employed to fit the data points (w1, h1), (w2, h2), ... (wn, hn) into the convex function curve 502 include h=k/w+b, h=k/w+m/($w^3$)+b, etc., where k, m, and b are nonnegative.

At step 458, a number of sampling points may be located across the maximal range of widths (w). By way of example, the sampling range of widths for an object 102a may be between 50 and 500 points and 20 sampling points may be located.

The number of sampling points may be selected as a trade-off between precision and speed. For instance, a relatively larger number of sampling points may be selected to increase the accuracy, while decreasing the speed at which a layout may be generated. In addition, the sampling points may be selected such that the intervals between the heights of the sampling points are constant, to thereby ensure that a generally representative range of data points are considered in the layout generation.

At step 460, linear constraints associated with the convex function models built at step 456 may be calculated, which define constraints on the height-width relationships of the objects 102a-102n. In this regard, the linear constraints may be calculated for each of the objects 102a-102n containing text whose dimensions X(i) are allowed to change. The linear constraints for each of the objects 102a-102n containing text may be based upon the sampling points (i) located from the convex function curve 502 at step 458. In one embodiment, the linear constraints may be determined through the following equation:

$$F(w,i) = h[i] + (h[i] - h[i-1]) * (w - w[i-1]) / (w[i] - w[i-1]),$$
where $$h \geq F(w,i), i=1, \ldots, n. \qquad \text{Equation (3)}$$

Equation (3) may be employed to calculate the linear constraints. More particularly, Equation (3) may be employed to calculate clusters of linear constraints based upon the convex function curves 502, as determined at step 456. In addition, the number of linear constraints calculated at step 460 may correspond to the number of sampling points located at step 458.

Figure 5B:
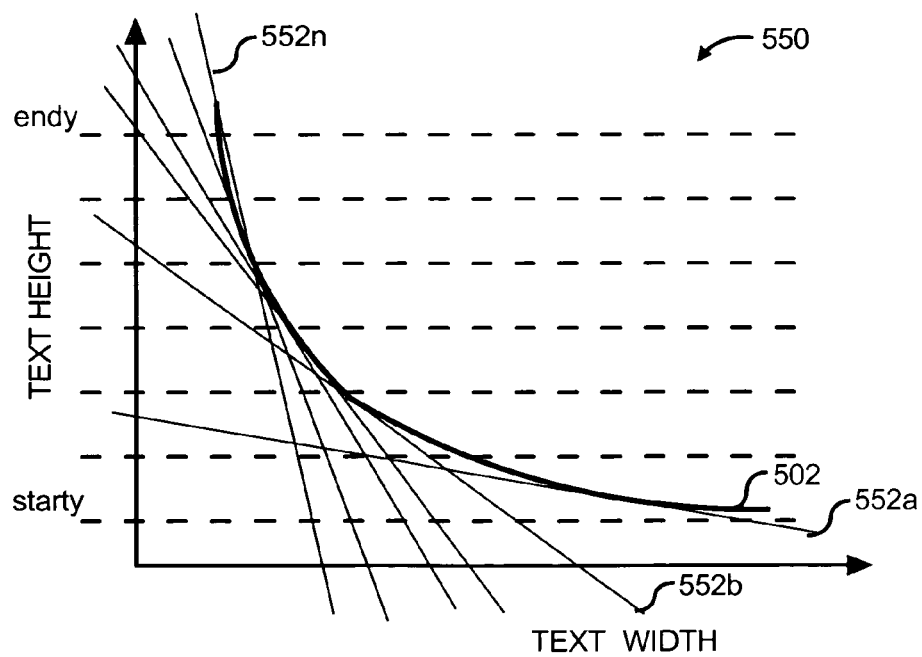
FIG. 5B shows a graph of the convex function curve from FIG. 5A and a cluster of linear constraints calculated from the convex function curve, according to an embodiment of the invention.

An example of the linear constraints for an object 102a containing text corresponding to a convex function curve 502 is depicted in FIG. 5B. More particularly, FIG. 5B illustrates a graph 550, in which, the linear constraints are graphically illustrated in the form of lines 552a-552n, each of which corresponds to a linear constraint. In addition, the lines 552a-552n form a cluster of linear constraints. As such, if Equation (3) is satisfied for the linear constraints at all of the sampled points, the original non-linear constraint depicted in Equation (2) may be fulfilled with a relatively high level of accuracy. In this regard, the cluster of linear constraints may describe the convex relationship between the height and the width of the object 102a. As such, the cluster of linear constraints may be employed to determine the heights that correspond to various widths of the object 102a with a relatively high degree of precision.

At step 462, the linear constraints calculated at step 460 may be appended to existing constraints. The existing constraints may include, for instance, various restrictions on either or both the positions P(i) and dimensions X(i) of the objects 102a-102n, as described in greater detail herein above. By way of example, with reference back to FIG. 1, some of the constraints may include that the object 102a is located to the left of the object 102b, that the object 102c have the same width and the object 102a and is located below the object 102a, that the object 102d have a smaller height than the object 102c, and that the objects 102a-102n containing text may have any width and height values so long as the resulting layout complies with the conditions above.

In any respect, the existing constraints may be in the form of linear constraints as described above. In addition, solutions to the existing constraints and the linear constraints calculated at step 460 may be determined at step 464. More particularly, at step 464, the linear constraints may be solved to generally ensure that the constraints are satisfied. In solving the linear constraints, values for the estimated dimensions X'(i) of the objects (i) containing text and the positions P(i) of the objects (i) may be calculated using constraint-satisfaction algorithms, such as the Simplex algorithm.

At step 466, the estimated dimensions X'(i) calculated at step 464 may be mapped back to the actual dimensions X(i) to determine whether there are errors in the estimated dimensions X'(i). The actual dimensions X(i) may comprise the dimensions of the objects 102a-102n rendered at step 454. In addition, at step 468, it may be determined as to whether the values for the estimated heights of the objects 102a-102n solved for at step 464 accurately correspond to the estimated widths of the objects 102a-102n. Step 468 may be performed, for instance, because the convex function models for the objects 102a-102n calculated at step 460 are approximations.

The comparison may be based upon the actual height that correlates to a given width for each of the objects 102a-102n, which may be determined through actual content placement of the objects 102a-102n with the widths fixed at the values calculated at step 454. The actual correlation between the height and the width of an object 102n may be determined through use of any reasonably suitable known line-breaking algorithm.

If it is determined that the calculated height differs from the actual height for an object 102n, a correction may be made to the object 102n, such that the height of the object 102n may be fixed to the actual height, as indicated at step 470. To provide a better understanding of steps 466-470, an example is provided below based upon a number of constraints, including the following constraint for the dimensions for an object 102c:

$$h(102c) \geq 67.6 - (w(102c) - 1059.5) * 0.067$$

$$h(102c) \geq 101.9 - (w(102c) - 543.6) * 0.19 \qquad \text{Equation (4)}$$

In this example, a solution to the linear constraints outputted an indication that the width of the object 102c (w(102c)) is equal to 172.8 and that the height of the object 102c (h(102c)) is equal to 254.9. The relationship between the width of the object 102c (w(102c)) and the height of the object 102c (h(102c)) is based upon the multi-linear model approximated at step 460, and thus may be inaccurate. More particularly, for instance, the relationship may be inaccurate because the text may have been broken into a number of lines whose width is the solution width and the height of all lines may be more than or less than the solution height.

A determination may be made as to whether the height of the object 102c (h(102c)=254.9) is an accurate value relative to the width of the object 102c (w(102c)=172.9). This determination may be made by actually placing the text in the object 102c under the condition that the width of the object 102c (w(102c))=172.9. The determination of the height of the object 102c (h(102c)) may also be performed through any reasonably suitable line-breaking algorithm, for instance. The height of the object 102c (h(102c)) in this example may be equal to 202.5, which differs from the height value calculated for the object 102c at step 454. As such, the less accurate value of 254.9 is replaced with the more accurate value of 202.5 for the Δheight of the object 102c (Δh(102c)) for subsequent operations in the method 450.

Following step 470, the dimensions (X(i)) of the objects 102a-102n may be fixed and the linear constraints may be solved again to determine the corrected positions (P(i)) of the objects 102a-102n, at step 472. More particularly, the positions (P(i)) of the objects 102a-102n may be optimized using constraint-satisfaction algorithms, for instance, as described with respect to step 464. In addition, the constraints employed at step 472 for the dimensions (X(i)) of the objects 102a-102n may include the widths for the objects 102a-102n determined at step 464 and the corresponding heights for the objects 102a-102n determined at step 470. Thus, with respect to the example described above, the constraint depicted by Equation (4) may be replaced as follows at step 472:

w(102c)=172.8.                                   Equation (5)

h(102c)=202.5.                                   Equation (6)

The solutions to the constraints calculated by a constraint-solving algorithm to solve the linear constraints for the positions (P(i)) of the objects 102a-102n at step 472 may differ from the solutions calculated at step 464 because the constraints identifying the constraints have changed from those employed at step 464.

At step 474, if it is determined at step 468 that no corrections are needed, the new layout 100 may be rendered such that the objects 102a-102n have the dimensions X'(i) and are positioned according to the positions P(i) determined at step 464. In addition, at step 474, the new layout 100 may be rendered such that the objects 102a-102n have the dimensions (X(i)) determined at step 470 and the objects 1021-102n are positioned according to the positions (P(i)) of the objects 102a-102n determined at step 472, if a correction is made at step 470. In either case, step 474 may also include outputting of the new layout 100 in any reasonably suitable format, such as, a portable document file (PDF).

Figure 4C:
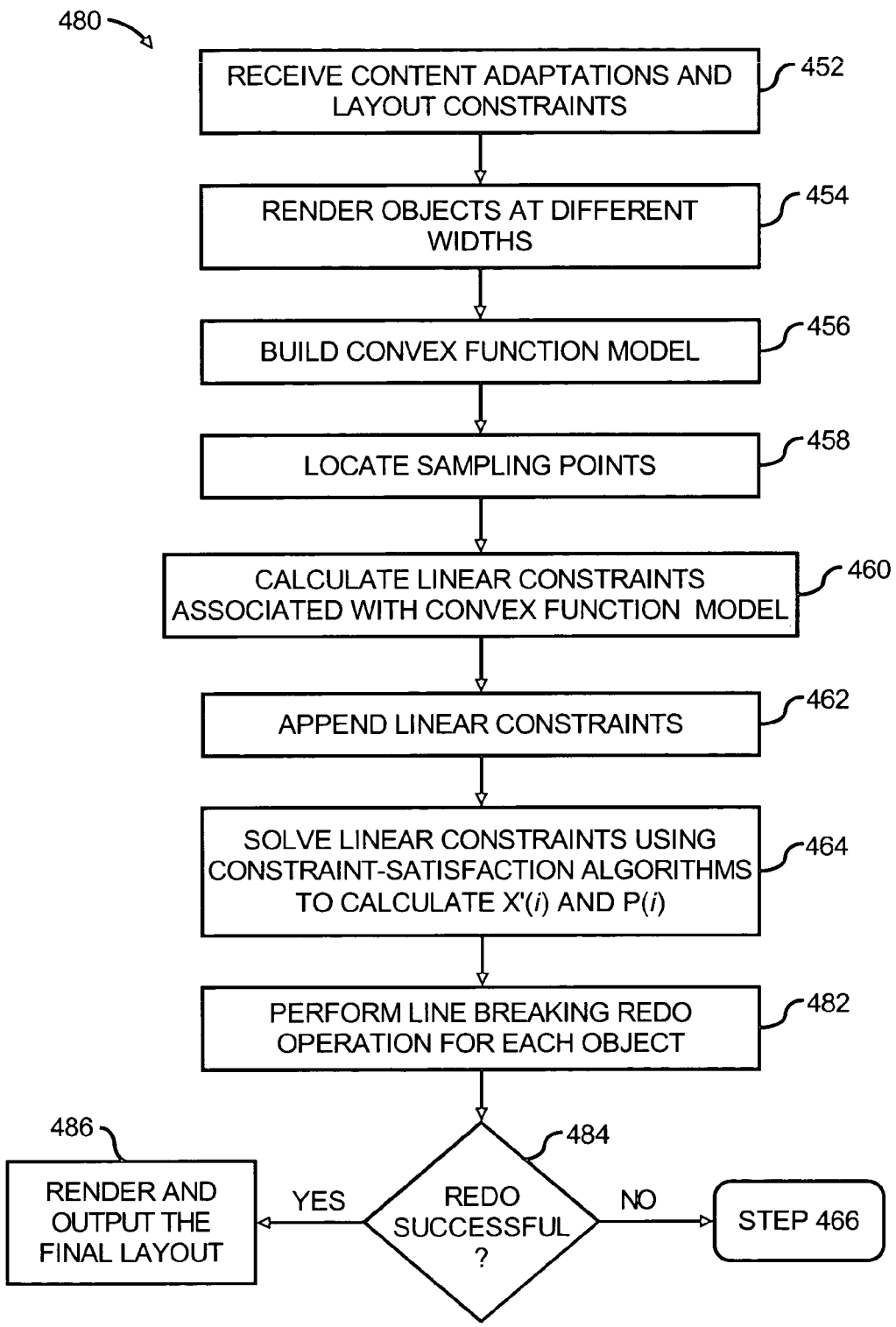
FIG. 4C illustrates a flow diagram of a method similar to the method depicted in FIG. 4A, according to another embodiment of the invention.

With reference now to FIG. 4C, there is shown a flow diagram of a method 480 for automatically generating a document layout, according to another example. The method 480 contains many of the same or similar steps as contained in the method 450. As such, the same or similar steps will not be described in detail with respect to the method 480. Instead, the differences between the method 480 and the method 450 will be described below.

In this respect, following step 464, a line breaking redo operation is performed at step 482. A description of the line breaking redo operation is presented by way of the following example. An object 102n contains text and is subject to a text constraint. In addition, a solution of the approximate constraints produces a solution with the object positioned at P(102n) and having the dimensions w(102n) and h(102n) estimated at step 464. In this method, the line breaks for the object 102n are recomputed using the estimated width w(102n) and choosing the breaks to produce the best line-breaking possible subject to the extra constraint that the stack of lines produced must end up having the estimated height h(102n). In other words, the line breaks of the text, and in certain instances, the spacing between words/characters, contained in the object 102n may be modified such that the object 102n has the estimated height h(102n).

At step 484, it may be determined as to whether the line breaking redo operation was successful. The line breaking redo operation may, in certain instances, be unable to fit the text into the estimated height h(102n), and may thus be unsuccessful. In this instance, some of the steps contained in the method 450 may be invoked beginning at step 466 (FIG. 4B). In addition, steps 468-474 may also be performed following step 466 as described hereinabove.

If, however, it is determined at step 484 that the line breaking redo operation was successful, the new layout 100 may be rendered, at step 486, such that the objects 1021-102n have the dimensions X'(i) and are positioned according to the positions P(i) determined at step 464.

Some or all of the principles described with respect to FIGS. 4A-4C may be implemented in other publishing operations. For instance, these principles may be implemented in formatting a table, where the optimal layout of table cells, given the grid structure of the table and the content to be included in the table, are to be determined. The optimal table layout may be defined as the layout that leads to the minimal table height, while satisfying other aesthetic criteria, such as balance.

Figure 6:
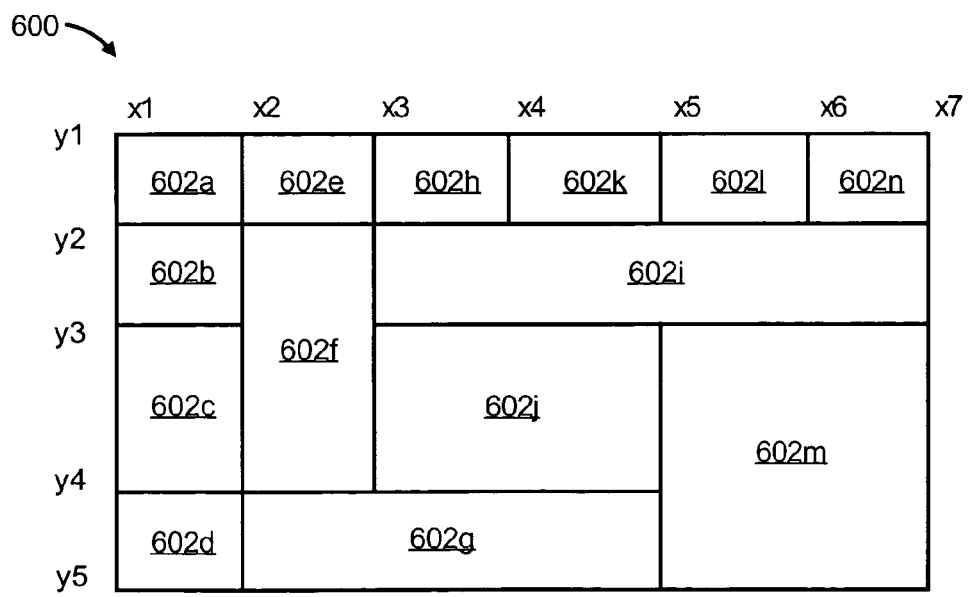
FIG. 6 shows a schematic diagram of a generated table that includes cells positioned at various locations in the table, according to an embodiment of the invention.

An example of a table layout 600 containing a plurality of cells 602a-602n upon which the various principles described above may be employed is depicted in FIG. 6. As shown, the cells 602a-602n generally comprise non-uniform heights and widths and are thus configured to contain one or both of text and images of varying sizes. It should be understood that the depiction of the cells 602a-602n in FIG. 6 is for purposes of illustration and is not meant to limit the document layout generation systems and method described herein. In addition, many of the principles described above with respect to the document layout 100 and the objects 102a-102n are applicable to the table layout 600 and the cells 602a-602n. As such, much of the description above with respect to the objects 102a-102n and the document layout 100 may be applied to the cells 602a-602n and the table layout 600 as described below.

The dimensions, heights (h) and widths (w), of each of the cells 602a-602n may be expressed as a vector X(i), where "i" represents a cell 6021-602n. The position of each of the cells 602a-602n may be specified as a set of coordinates P(i) defined according to a Cartesian coordinate system. As such, the coordinates P(i) may represent x and y coordinates, as shown in FIG. 6. This convention for identifying the positions and dimensions of the cells 602a-602n is employed throughout the present disclosure for purposes of simplicity. It should, however, be understood that various other manners may be employed to identify the positions and sizes of the cells 602a-602n without departing from a scope of the document layout generation systems and methods described herein.

Figure 7A:
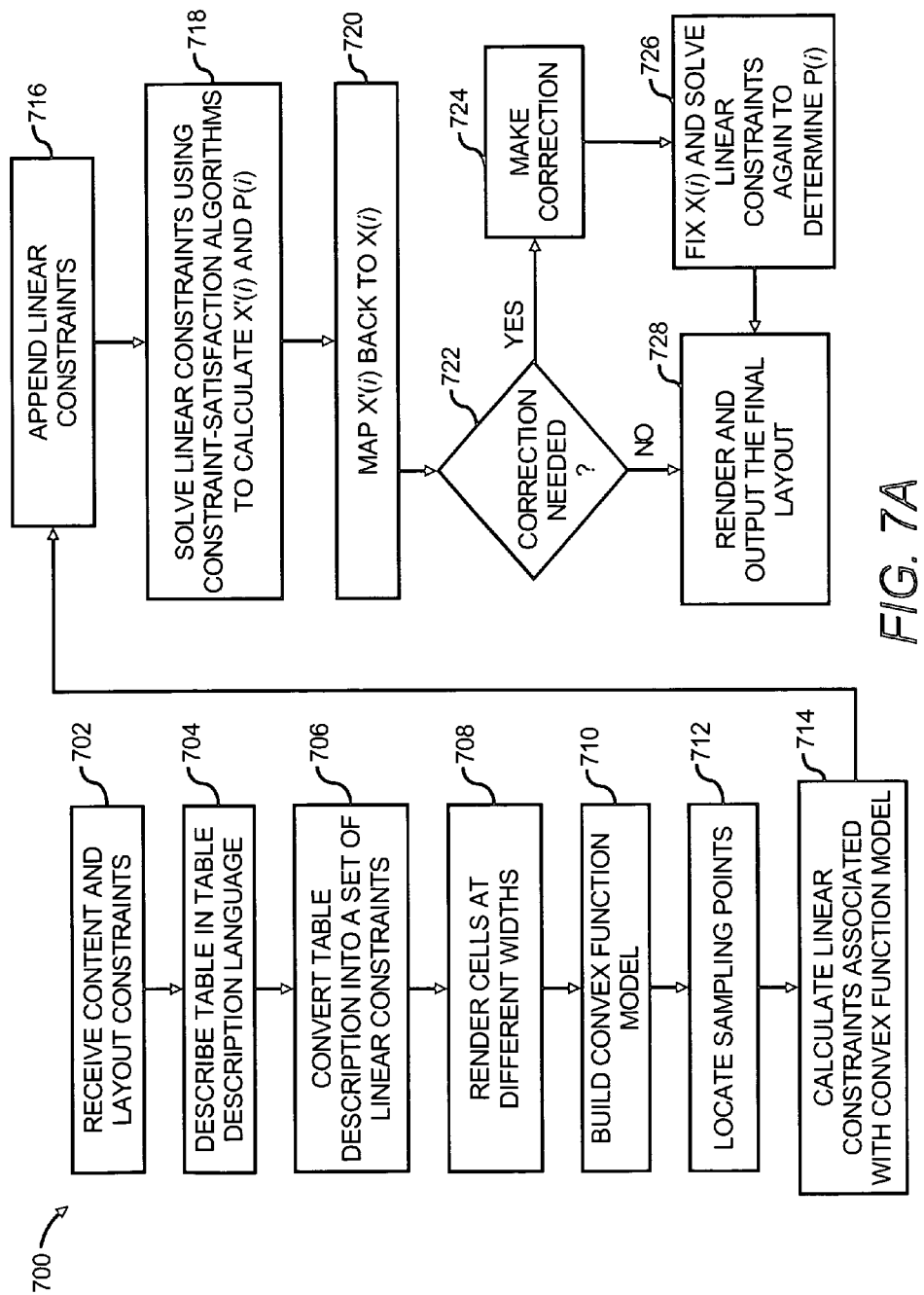
FIG. 7A illustrates a flow diagram of a method similar to the method depicted in FIG. 4A, according to a further embodiment of the invention.

With reference now to FIG. 7A, there is shown a there is shown a flow diagram of a method 700 for automatically generating a table layout. It is to be understood that the following description of the method 700 is but one manner of a variety of different manners in which the table layout may be generated. It should also be apparent to those of ordinary skill in the art that the method 700 represents a generalized illustration and that other steps may be added or existing steps may be removed or modified without departing from a scope of the method 700. The description of the method 700 is made with reference to the block diagram 300 illustrated in FIG. 3, and thus makes reference to the elements cited therein. It should, however, be understood that the method 700 is not limited to being implemented by the elements shown in FIG. 3 and may be implemented by more, less, or different elements as those shown in FIG. 3.

The method 700 may be implemented as an automated algorithm for generating a table layout, such as the table layout 600 of cells 602a-602n depicted in FIG. 6, according to various criteria as described below. Broadly speaking, generation of the table layout 600 includes a determination of the positions P(i) and attributes X(i) of the cells 602a-602n based upon various constraints and other criteria. In addition, generation of the table layout 600 also includes placing the cells 602a-602n in the table layout 600 at their determined positions and with their determined attributes.

As shown in FIG. 7A, the layout generation system 302 may receive content and layout constraints to be used in generating a table layout 600, at step 702. The content may include content in the form of text to be included in the various cells 602a-602n. The constraints may be in the form of a template and may include limitations to be applied with respect to one or both of the positions P(i) and attributes X(i) of the cells 602a-602n. In other words, the constraints may comprise various restrictions in the manners in which the cells 602a-602n are positioned and sized in the table layout 600. The constraints may generally be imposed in order to retain certain aesthetic requirements in the table layout 600 as well as to ensure that the cells 602a-602n are arranged in a logical manner. In this regard, the constraints may comprise, for instance, alignment constraints, aspect ratio constraints, dimension range constraints, separation constraints, order constraints, etc. Thus, for instance, the constraints may require that the cell 602a be above the cell 602b, that the cell 602f have the same height as the combined heights of cells 602b and 602c, etc.

The table layout 600 may be described in any reasonably suitable table description language, such as, for instance, Extensible Markup Language (XML), at step 704. In addition, adaptors using programs such as Extensible Stylesheet Language Transformations (XSLT) and DOM/SAX may be implemented to convert other description language formats into a desired table description language. An example of an XSLT is Java API for XML Processing (JAXP) to XSL-FO.

At step 706, the table description may be converted into a set of linear constraints that define a number of constraints. Any reasonably suitable converter program may be employed to convert the table description into the set of linear constraints.

Additional constraints in the form of linear constraints may also be added, for instance, to generally enhance the aesthetics of the table layout 600. For instance, additional constraints may be added to ensure that the table layout 600 comprise a minimal height. The additional constraints may also be in the form of linear constraints. More particularly, for instance, the layout generation system 302 may receive the constraints in the form of linear constraints having equalities or inequalities. Alternatively, the layout generation system 302 may receive the constraints in the form of aesthetic rules which the layout generation system 302 may encode into constraints in the form of linear constraints having equalities or inequalities.

In addition to the constraints, the table description language may also be used to generate the layout description, which may be used to render the table layout 600 after the constraints are solved.

At step 708, for those cells 602a-602n containing text whose heights and widths are allowed to change, the cells 602a-602n are rendered at several different widths (w1, w2, . . . wn) to determine their corresponding heights (h1, h2, . . . hn). As described herein above, a linear constraint is typically unavailable to determine the width-height relationships because the relationships between the widths and heights of the cells 602a-602n containing text are nonlinear. Instead, the width-height relationships may be determined through a method that actually replaces the text content in the cells 602a-602n into various text containers having different widths to determine this width-height relationship. An example of a result of this estimation method is shown in Table 1 above, which illustrates discrete pairs of widths and heights.

At step 710, a convex function model may be built based upon the data points (w1, h1), (w2, h2), . . . (wn, hn) determined at step 708. The convex function model may be built out of a number of rendering results with different (w, h) combinations as described in greater detail hereinabove with respect to FIG. 4B.

At step 712, a number of sampling points may be located across the maximal range of widths (w). By way of example, the sampling range of widths for a cell 602a may be between 50 and 500 points and 20 sampling points may be located. The number of sampling points may be selected as a trade-off between precision and speed. For instance, a relatively larger number of sampling points may be selected to increase the accuracy, while decreasing the speed at which a layout may be generated. In addition, the sampling points may be selected such that the intervals between the heights of the sampling points are constant, to thereby ensure that a generally representative range of data points are considered in the layout generation.

At step 714, linear constraints associated with the convex function models for the cells 602a-602n built at step 710 may be calculated. In this regard, the linear constraints may be calculated for each of the cells 602a-602n containing text whose dimensions X(i) are allowed to change. The linear constraints for each of the cells 602a-602n containing text may be based upon the sampling points located from the convex function curve 502 at step 712, and may be determined through Equation (3) cited above.

As described above, Equation (3) may be employed to calculate the linear constraints. More particularly, Equation (3) may be employed to calculate clusters of linear constraints based upon the convex function curves 502, as determined at step 710. In addition, the number of linear constraints calculated at step 714 may correspond to the number of sampling points located at step 712. An example of the linear constraints for a cell 602a containing text corresponding to a convex function curve 502 is depicted in FIG. 5B and is described in greater detail hereinabove.

At step 716, the linear constraints calculated at step 714 may be appended to the existing constraints, which may also be in the form of linear constraints. The existing constraints may include, for instance, various restrictions on either or both the positions P(i) and dimensions X(i) of the cells 602a-602n, as described in greater detail herein above.

Solutions to the existing constraints and the linear constraints calculated at step 716 may be determined at step 718. More particularly, at step 718, the linear constraints may be solved to generally ensure that the existing constraints and the linear constraints calculated at step 716 are satisfied. In solving the linear constraints, values for the estimated dimensions X'(i) of the objects (i) containing text and the positions P(i) of the objects (i) may be calculated using constraint-satisfaction algorithms, such as the Simplex algorithm, as also described hereinabove with respect to FIG. 4B.

At step 720, the estimated dimensions X'(i) calculated at step 718 may be mapped back to the actual dimensions X(i) to determine whether there are errors in the estimated dimensions X'(i). The actual dimensions X(i) may comprise the dimensions of the cells 602a-602n rendered at step 708. In addition, at step 722, it may be determined as to whether the values for the estimated heights of the cells 602a-602n solved for at step 718 accurately correspond to the estimated widths of the cells 602a-602n. Step 722 may be performed, for instance, because the convex function models for the cells 602a-602n calculated at step 714 are approximations.

The comparison may be based upon the actual height that correlates to a given width for each of the cells 602a-602n, which may be determined through actual content placement of the cells 602a-602n with the widths fixed at the values calculated at step 708. The actual correlation between the height and the width of a cell 602n may be determined through use of any reasonably suitable known line-breaking algorithm.

If it is determined that the calculated height differs from the actual height for a cell 602n, a correction may be made to the cell 602n, such that the height of the cell 602n may be fixed to the actual height, as indicated at step 724. An example of steps 718-724 is provided above with respect to steps 466-470 and is thus not repeated here.

Following step 724, the dimensions (X(i)) of the cells 602a-602n may be fixed and the linear constraints may be solved again to determine the corrected positions (P(i)) of the cells 602a-602n, at step 726. More particularly, the positions (P(i)) of the cells 602a-602n may be optimized using constraint-satisfaction algorithms, for instance, as described with respect to step 718. In addition, the constraints employed at step 726 for the dimensions (X(i)) of the cells 602a-602n may include the widths for the cells 602a-602n determined at step 718 and the corresponding heights for the cells 602a-602n determined at step 724.

The solutions to the constraints calculated by a constraint-solving algorithm to optimize a layout quality function for the positions (P(i)) of the cells 602a-602n at step 726 may differ from the solutions calculated at step 718 because the constraints identifying the constraints have changed from those employed at step 718.

At step 728, if it is determined at step 722 that no corrections are needed, the table layout 600 may be rendered such that the cells 602a-602n have the dimensions X'(i) and are positioned according to the positions P(i) determined at step 718. In addition, at step 728, the table layout 600 may be rendered such that the cells 602a-602n have the dimensions (X(i)) determined at step 724 and the cells 602a-602n are positioned according to the positions (P(i)) of the cells 602a-602n determined at step 726, if a correction is made at step 724. In either case, step 728 may also include outputting of the table layout 600 in any reasonably suitable format, such as, a portable document file (PDF).

Figure 7B:
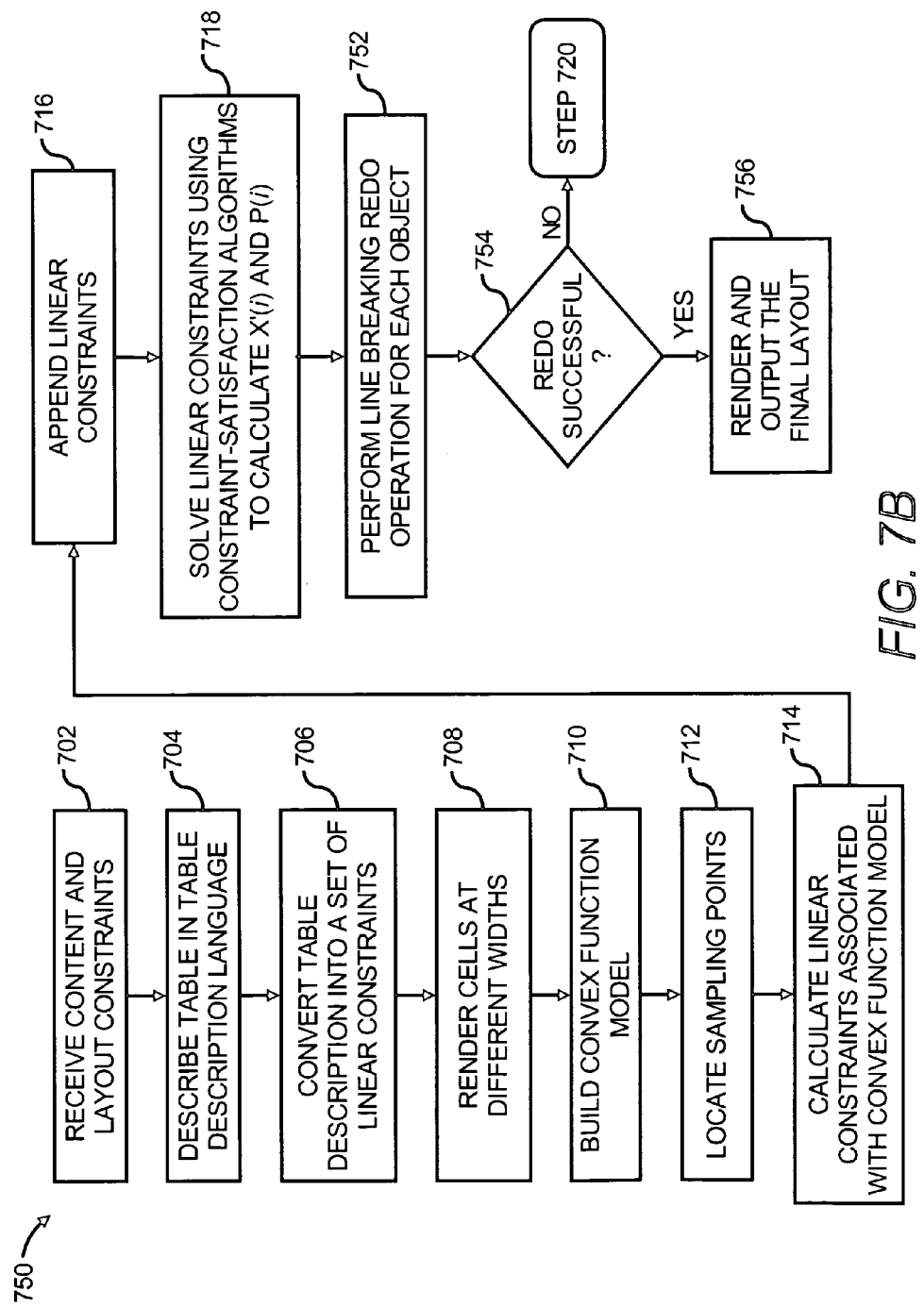
FIG. 7B illustrates a flow diagram of a method similar to the method depicted in FIG. 7A, according to yet another embodiment of the invention.

With reference now to FIG. 7B, there is shown a flow diagram of a method 750 for automatically generating a table layout, according to another example. The method 750 contains many of the same or similar steps as contained in the method 700 shown in FIG. 7A. As such, the same or similar steps will not be described in detail with respect to the method 750. Instead, the differences between the method 700 and the method 750 will be described below.

In this respect, following step 718, a line breaking redo operation is performed at step 752. A description of the line breaking redo operation is presented by way of the following example. A cell 602n contains text and is subject to a text constraint. In addition, a solution of the approximate constraints produces a solution with the cell positioned at P(602n) and having the dimensions w(602n) and h(602n) estimated at step 718. In this method, the line breaks for the cell 602n are recomputed using the estimated width w(602n) and choosing the breaks to produce the best line-breaking possible subject to the extra constraint that the stack of lines produced must end up having the estimated height h(602n). In other words, the line breaks of the text, and in certain instances, the spacing between words/characters, contained in the cell 602n may be modified such that the cell 602n has the estimated height h(602n).

At step 754, it may be determined as to whether the line breaking redo operation was successful. The line breaking redo operation may, in certain instances, be unable to fit the text into the estimated height h(602n), and may thus be unsuccessful. In this instance, some of the steps contained in the method 700 may be invoked beginning at step 720 (FIG. 7A). In addition, steps 722-728 may also be performed following step 720 as described hereinabove.

If, however, it is determined at step 754 that the line breaking redo operation was successful, the table layout 600 may be rendered, at step 756, such that the cells 602a-602n have the dimensions X'(i) and are positioned according to the positions P(i) determined at step 718.

Some or all of the operations illustrated in the methods 400, 450, 480, 700, and 750 may be contained as a utility, program, or a subprogram, in any desired computer accessible medium. In addition, the methods 400, 450, 480, 700, and 750 may be embodied by a computer program, which can exist in a variety of forms both active and inactive. For example, they can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 8:
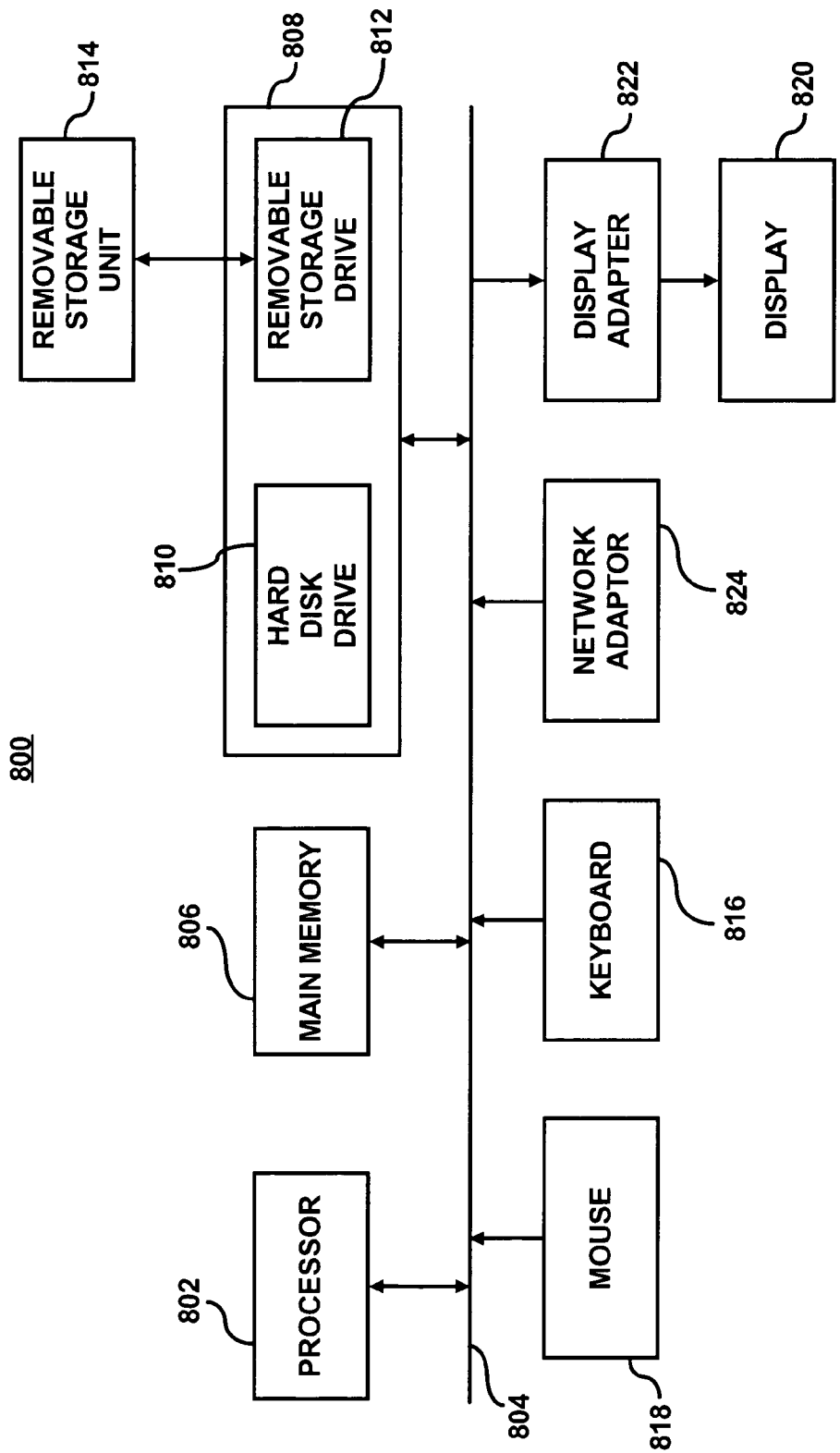
FIG. 8 illustrates a computer system, which may be employed to perform various functions described herein, according to an embodiment of the invention.

FIG. 8 illustrates a computer system 800, which may be employed to perform various functions described herein. The computer system 800 may include, for example, the controller 304. In this respect, the computer system 800 may be used as a platform for executing one or more of the functions described herein above with respect to the various components of the layout generation system 302.

The computer system 800 includes one or more controllers, such as a processor 802. The processor 802 may be used to execute some or all of the steps described in the methods 400, 450, 480, 700, and 750. Commands and data from the processor 802 are communicated over a communication bus 804. The computer system 800 also includes a main memory 806, such as a random access memory (RAM), where the program code for, for instance, the controller 304, may be executed during runtime, and a secondary memory 808. The secondary memory 808 includes, for example, one or more hard disk drives 810 and/or a removable storage drive 812, representing a floppy diskette drive, a magnetic tape drive, a compact disk drive, etc., where a copy of the program code for the layout generation system 302 may be stored.

The removable storage drive 810 reads from and/or writes to a removable storage unit 814 in a well-known manner. User input and output devices may include a keyboard 816, a mouse 818, and a display 820. A display adaptor 822 may interface with the communication bus 804 and the display 820 and may receive display data from the processor 802 and convert the display data into display commands for the display 820. In addition, the processor 802 may communicate over a network, for instance, the Internet, LAN, etc., through a network adaptor 824.

It will be apparent to one of ordinary skill in the art that other known electronic components may be added or substituted in the computer system 800. In addition, the computer system 800 may include a system board or blade used in a rack in a data center, a conventional "white box" server or computing device, etc. Also, one or more of the components in FIG. 8 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for automatically generating a document layout including an object containing text, said method comprising:
   rendering the object at different widths to determine actual corresponding heights;
   building an approximate convex function model for the object based upon the widths and the actual corresponding heights of the object
   calculating linear constraints associated with the approximate convex function model;
   solving the linear constraints using a constraint satisfaction algorithm; and
   automatically generating the document layout based substantially upon the solutions to the linear constraints.

2. The method according to claim 1, wherein the step of building the approximate convex function model for the object further comprises fitting the widths (w) and the actual corresponding heights (h) of the object according to $h(w)=k/w+b$, wherein k and b are constant, and wherein k and b are calculated through a regression operation.

3. The method according to claim 1, further comprising:
   locating sampling points along a maximal range of widths of the object; and
   wherein the step of calculating linear constraints associated with the convex function model further comprises calculating linear constraints associated with the convex function model at the located sampling points.

4. The method according to claim 3, wherein the step of calculating linear constraints associated with the convex function model at the located sampling points further comprises calculating a cluster of linear constraints, $F(w,i)=h[i]+(h[i]-h[i-1])*(w-w[i-1])/(w[i]-w[i-1])$, $h>=F(w,i)$, wherein $i=1, \ldots, n$, and wherein h is the height of the object, w is the width of the object, and i is the located sampling point.

5. The method according to claim 3, further comprising:
   appending the calculated linear constraints to at least one existing linear constraint, wherein the at least one existing linear constraint comprises a restriction on one or both of the dimensions of the object and the position of the object in the document layout.

6. The method according to claim 5, wherein the step of solving the linear constraints using a constraint satisfaction algorithm further comprises solving the calculated linear constraints and at least one existing linear constraint using the constraint satisfaction algorithm to calculate estimated dimensions of the object, wherein the estimated dimensions comprise an estimated height and an estimated width of the object.

7. The method according to claim 6, further comprising:
   determining whether an estimated dimension of the object is inaccurate; and
   correcting an estimated dimension in response to a determination that at least one of the estimated height and the estimated width is inaccurate.

8. The method according to claim 7, wherein the step of determining whether an estimated dimension is inaccurate further comprises comparing the estimated height to a first height of the object and determining that the estimated height is inaccurate in response to the estimated height differing from the first height, wherein the first height is the actual height corresponding to the estimated width.

9. The method according to claim 7, wherein the step of correcting an estimated dimension of the object further comprises replacing the estimated height with the first height in defining the estimated dimensions of the object.

10. The method according to claim 9, wherein the object is defined by a position with respect to the document layout, said method further comprising:
    fixing the dimensions of the object such that the object has the estimated width and the first height; and
    solving the calculated linear constraints and the at least one existing linear constraint using the estimated width and the first height of the fixed dimensions to thereby determine the position of the object in the document layout.

11. The method according to claim 7, wherein the step of determining whether an estimated dimension is inaccurate further comprises performing a line breaking redo operation on the object and determining whether the line breaking redo operation was successful.

12. The method according to claim 11, further comprising:
    determining whether an estimated dimension of the object is inaccurate in response to a determination that the line breaking redo operation was unsuccessful;
    correcting an estimated dimension in response to a determination that at least one of the estimated height and the estimated width is inaccurate;
    fixing the dimensions of the object such that the object has the estimated width and the first height; and
    solving the calculated linear constraints and the at least one existing linear constraint using the estimated width and the first height of the fixed dimensions to thereby determine the position of the object in the document layout.

13. The method according to claim 1, wherein the document layout comprises a table and wherein the object comprises a cell in the table, the method further comprising:
    describing the table in a table description language;
    converting the table into a set of linear constraints; and
    rendering the cell at different widths to determine corresponding heights prior to the step of building the approximate convex function model for the cell.

14. A method for automatically generating a document layout including a plurality of objects containing text, said method comprising:
    building approximate convex function models for the plurality of objects containing text;
    calculating respective linear constraints associated with the approximate convex function models;
    solving the linear constraints using a constraint satisfaction algorithm;

automatically generating the document layout based upon the solutions to the linear constraints;

for those objects whose estimated dimensions are determined as being inaccurate, correcting an estimated dimension;

solving the linear constraints based upon the corrected estimated dimensions of the objects to thereby determine positions of the plurality of objects in the document layout; and wherein the step of automatically generating the document layout further comprises automatically generating the document layout such that the plurality of objects have the estimated dimensions and are positioned at the estimated positions in the document layout.

15. A system for automatically generating a document layout including an object containing text, said system comprising:

a memory storing a plurality of layout generation modules; and a controller configured to implement the plurality of layout generation modules to render the object at different widths to determine actual corresponding heights, to build an approximate convex function model for the object based upon the widths and the actual corresponding heights of the object, to calculate linear constraints associated with the approximate convex function model; to solve the linear constraints using a constraint satisfaction algorithm, to solve for estimated dimensions of the object, to determine whether an estimated dimension of the object is inaccurate, to correct the estimated dimension in response to an estimated dimension being inaccurate, and to automatically generate the document layout based substantially upon the solutions to the linear constraints.

16. The system according to claim 15, wherein the controller is further configured to determine the correct dimensions and to replace the inaccurate estimated dimension with the correct dimension.

17. The system according to claim 16, wherein the controller is further configured to fix the dimensions of the object, such that the object has the estimated width and the first height, and to solve the linear constraints using the estimated width and the first height of the fixed dimensions to thereby determine the position of the object in the document layout.

18. The system according to claim 15, wherein the controller is further configured to perform a line breaking redo operation on the object to determine whether the estimated dimension of the object is inaccurate.

19. The system according to claim 15, wherein the document layout comprises a table and the object comprises a cell in the table, and wherein the controller is further configured to implement the plurality of layout generation modules to describe the table in a table description language, to convert the table into a set of linear constraints, and to render the cell at different widths to determine heights of the cell corresponding to the different widths.

20. A computer system comprising:

means for rendering an object containing text at different widths to determine actual corresponding heights;

means for building an approximate convex function model of the object containing text based upon the widths and the actual corresponding heights of the object;

means for calculating linear constraints associated with the approximate convex function model;

means for solving the linear constraints;

means for correcting at least one of the dimensions and position of the object in a document layout; and means for generating a layout based substantially upon the means for solving and the means for correcting.

21. A computer readable storage medium on which is embedded one or more computer programs, said one or more computer programs implementing a method for automatically generating a document layout including an object containing text, said one or more computer programs comprising a set of instructions for:

rendering the object at different widths to determine actual corresponding heights;

building an approximate convex function model for the object based upon the widths and the actual corresponding heights of the object;

calculating linear constraints associated with the approximate convex function model;

solving the linear constraints using a constraint satisfaction algorithm; and automatically generating the document layout based substantially upon the solutions to the linear constraints.

22. The computer readable storage medium according to claim 21, wherein the document layout comprises a table and wherein the object comprises a cell in the table, said one or more computer programs further comprising a set of instructions for:

describing the table in a table description language;

converting the table into a set of linear constraints; and wherein rendering the object further comprises rendering the cell at different widths to determine actual corresponding heights.

\* \* \* \* \*

UNITED STATES PATENT AND TRADEMARK OFFICE
CERTIFICATE OF CORRECTION

| | | |
|---|---|---|
| PATENT NO. | : 7,434,159 B1 | Page 1 of 1 |
| APPLICATION NO. | : 11/126637 | |
| DATED | : October 7, 2008 | |
| INVENTOR(S) | : Xiaofan Lin | |

It is certified that error appears in the above-identified patent and that said Letters Patent is hereby corrected as shown below:

Title Page, Item (54), in column 1, in "Title", line 1,
delete "AUTOMATICALLY" and insert -- AUTOMATIC --, therefor.

In column 1, line 1, delete "AUTOMATICALLY" and insert -- AUTOMATIC --, therefor.

In column 6, line 4, delete "602a-502n" and insert -- 602a-602n --, therefor.

In column 7, line 20, delete "outlines" and insert -- outlined --, therefor.

In column 7, line 24, delete "outlines" and insert -- outlined --, therefor.

In column 9, line 6, after "are" insert -- all --.

In column 11, line 34, delete "1021-102n" and insert -- 102a-102n --, therefor.

In column 12, line 7, delete "1021-102n" and insert -- 102a-102n --, therefor.

In column 12, line 37, delete "6021-602n" and insert -- 602a-602n --, therefor.

In column 20, line 22, in Claim 21, after "A" insert -- tangible --.

Signed and Sealed this
Twentieth Day of March, 2012

David J. Kappos
*Director of the United States Patent and Trademark Office*